United States Patent
Kim et al.

(10) Patent No.: US 9,229,277 B2
(45) Date of Patent: Jan. 5, 2016

(54) DISPLAY SUBSTRATE, DISPLAY PANEL HAVING THE SAME, METHOD OF MANUFACTURING THE SAME AND METHOD OF MANUFACTURING THE DISPLAY PANEL

(75) Inventors: Young-Gu Kim, Hwaseong-si (KR); Byoung-Hun Sung, Seoul (KR); Baek-Kyun Jeon, Yongin-si (KR); Jin-Soo Jung, Hwaseong-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 557 days.

(21) Appl. No.: 13/532,030

(22) Filed: Jun. 25, 2012

(65) Prior Publication Data
US 2013/0222750 A1    Aug. 29, 2013

(30) Foreign Application Priority Data
Feb. 27, 2012  (KR) .................. 10-2012-0019840

(51) Int. Cl.
*G02F 1/1337* (2006.01)
*G02F 1/1343* (2006.01)

(52) U.S. Cl.
CPC .... *G02F 1/133753* (2013.01); *G02F 1/133707* (2013.01); *G02F 2001/133757* (2013.01); *G02F 2001/134345* (2013.01); *Y10T 29/49155* (2015.01)

(58) Field of Classification Search
CPC ............ G02F 1/133707; G02F 1/1337; G02F 1/133753; G02F 2001/133757
USPC .......................................... 349/129, 123, 130
See application file for complete search history.

(56) References Cited

U.S. PATENT DOCUMENTS

| | | | |
|---|---|---|---|
| 2004/0125297 A1* | 7/2004 | Lee ................................ | 349/129 |
| 2006/0066799 A1* | 3/2006 | Mizusako et al. ............ | 349/142 |
| 2009/0086141 A1 | 4/2009 | Shoraku et al. | |
| 2010/0085524 A1* | 4/2010 | Nakagawa .................... | 349/124 |
| 2010/0110306 A1* | 5/2010 | Yamada ........................ | 348/731 |
| 2012/0133872 A1* | 5/2012 | Kim et al. ..................... | 349/128 |

FOREIGN PATENT DOCUMENTS

| | | |
|---|---|---|
| JP | 2004-078248 | 3/2004 |
| KR | 0847978 | 7/2008 |
| KR | 1020100073285 | 7/2010 |

* cited by examiner

*Primary Examiner* — Thanh-Nhan P Nguyen
(74) *Attorney, Agent, or Firm* — F. Chau & Associates, LLC

(57) ABSTRACT

A display substrate includes a first electrode and a first alignment layer disposed on the first electrode. The first alignment layer includes first and second alignment parts. The first electrode has a first opening portion formed therethrough. The first and second alignment parts are disposed at two sides of the first opening portion. The first and second alignment parts have the different alignment directions from each other.

21 Claims, 12 Drawing Sheets

DISPLAY SUBSTRATE, DISPLAY PANEL HAVING THE SAME, METHOD OF MANUFACTURING THE SAME AND METHOD OF MANUFACTURING THE DISPLAY PANEL

CROSS-REFERENCE TO RELATED APPLICATIONS

This application claims priority under 35 U.S.C. §119 to Korean Patent Application No. 10-2012-0019840, filed on Feb. 27, 2012, the disclosure of which is hereby incorporated by reference herein in its entirety.

TECHNICAL FIELD

Exemplary embodiments of the present invention relate to a display substrate, a display panel having the display substrate, a method of manufacturing the display substrate and a method of manufacturing the display panel. More particularly, exemplary embodiments of the present invention relate to a display substrate for a display device, a display panel having the display substrate, a method of manufacturing the display substrate and a method of manufacturing the display panel.

DISCUSSION OF THE RELATED ART

A display panel may include, for example, a plurality of pixel parts. The display panel may include, for example, an array substrate, a facing substrate facing the array substrate, and a liquid crystal layer disposed between the array substrate and the facing substrate.

The array substrate includes, for example, a first base substrate, a pixel electrode disposed on the first base substrate and a first alignment layer disposed on the pixel electrode. The facing substrate includes, for example, a second base substrate, a common electrode disposed on the second base substrate to face the pixel electrode, and a second alignment layer disposed on the common electrode.

Liquid crystal molecules of the liquid crystal layer are aligned by the first and second alignment layers to have directionality.

To increase the visibility of the display panel, a plurality of sub-alignment parts having different directions may be included in each of the first and second alignment layers of the pixel part so that liquid crystals of the pixel part may be aligned in the different alignment direction along a plurality of domains corresponding to the sub-alignment parts.

However, a difference between a front luminance and a side luminance may be generated at a boundary of the sub-alignments parts, thereby varying the visibility of a display panel.

A light-blocking pattern having, for example, a metal material may be disposed at a boundary of the sub-alignment parts to increase visibility. However, the light-blocking pattern may decrease an aperture ratio of the display panel.

SUMMARY

Exemplary embodiments of the present invention may provide a display substrate for increasing the visibility and a light transmittance of a display panel.

Exemplary embodiments of the present invention may also provide a display panel having the above-mentioned display substrate.

Exemplary embodiments of the present invention may further also provide a method of manufacturing the above-mentioned display substrate.

Exemplary embodiments of the present invention may further also provide a method of manufacturing the above-mentioned display panel.

According to an exemplary embodiment of the present invention, a display substrate includes a first electrode and a first alignment layer disposed on the first electrode. The first alignment layer includes first and second alignment parts. The first electrode has a first opening portion formed therethrough. The first and second alignment parts are disposed at two sides of the first opening portion. The first and second alignment parts have the different alignment directions from each other.

In an exemplary embodiment, the display substrate may further include a gate line extended in a first direction. The first opening portion may be extended in the first direction. The first alignment part may be disposed at a first side of the first opening portion. The second alignment part may be disposed at a second side of the first opening portion.

In an exemplary embodiment, a width of the first opening portion may be about 2 μm to about 4.5 μm.

In an exemplary embodiment, the display substrate may further include a second electrode disposed adjacent to the first electrode and configured to receive a first voltage different from a second voltage applied to the first electrode with respect to an identical gradation. The second electrode having a second opening portion formed therethough. A second alignment layer may be disposed on the second electrode. The second alignment layer includes a third alignment part and a fourth alignment part. The third and fourth alignment parts are disposed at two sides of the second opening portion. The third and fourth alignment parts may have different alignment directions from each other.

In an exemplary embodiment, the display substrate may further include a data line extended in a second direction crossing the first direction. The second opening portion may be extended in the second direction. The third alignment part may be disposed at a first side of the second opening portion. The fourth alignment part may be disposed at a second side of the second opening portion.

According to an exemplary embodiment of the present invention, a display panel includes a first display substrate, a second display substrate and a liquid crystal layer. The first display substrate includes a first electrode and a first alignment layer disposed on the first electrode. The first alignment layer may include first and second alignment parts. The first electrode has a first opening portion formed therethrough. The first and second alignment parts are disposed at two sides of the first opening portion. The first and second alignment parts have the different alignment directions from each other. The second display substrate includes a second electrode facing the first electrode. The liquid crystal layer is disposed between the first display substrate and the second display substrate. The liquid crystal layer includes liquid crystal molecules aligned along the first and second alignment parts.

In an exemplary embodiment, the first display substrate may further include a gate line extended in a first direction. The first opening portion may be extended in the first direction. The first alignment part may be disposed at a first side of the first opening portion. The second alignment part may be disposed at a second side of the first portion.

In an exemplary embodiment, at least one of the alignment directions of the first or second alignment parts may be in parallel with the first direction, and the alignment directions of the first and second alignment parts may be opposite to each other.

In an exemplary embodiment, the second display substrate may further include a second alignment layer including a third alignment part facing first end portions of the first and second alignment parts, and a fourth alignment part facing second end portions of the first and second alignment parts. One of alignment directions of the third or fourth alignment parts may be in parallel with a second direction. The alignment directions of the first and second alignment parts may be opposite to each other.

According to an exemplary embodiment of the present invention, there is provided a method of manufacturing a display substrate. In the method, a transparent pattern including a first electrode having a first opening portion formed therethrough is formed on a base substrate. An alignment layer including first and second alignment parts disposed at two sides of a boundary of the first opening portion of the first electrode is formed.

In an exemplary embodiment, prior to forming the transparent pattern, a gate pattern including a gate line extended in a first direction may be formed on the base substrate. A data pattern including a data line extended in a second direction crossing the first direction may be formed on the base substrate where the gate pattern is formed. The first opening portion may be extended in the first direction.

In an exemplary embodiment, when the alignment layer is formed, a photoreactive material may be formed on the first electrode. Light may be irradiated onto the photoreactive material disposed at a first side with respect to the first opening portion to form the first alignment part having a first alignment direction different from the first direction. Light may be irradiated onto the photoreactive material disposed at a second side with respect to the first opening portion to form the second alignment part having a second alignment direction substantially perpendicular to the first alignment direction.

In an exemplary embodiment, when the transparent pattern is formed, a second electrode may be formed in adjacent to the first electrode, which has a second opening portion extended in the second direction. The second electrode is configured to receive a first voltage different from a second voltage applied to the first electrode with respect to a same gradation. When the alignment layer is formed, light may be irradiated onto the photoreactive material disposed at a first side with respect to the second opening portion to form a third alignment part having a third alignment direction different from the first direction. Light may be irradiated onto the photoreactive material disposed at a second side of the second opening portion to form a fourth alignment part substantially perpendicular to the third alignment direction.

According to an exemplary embodiment of the present invention, there is provided a method of manufacturing a display panel. In the method, a first electrode having a first opening portion formed therethrough is formed on a first base substrate and an alignment layer including first and second alignment parts is disposed at two sides of the first opening portion of the first electrode to form a first display substrate. A second electrode facing the first electrode is formed on a second base substrate to form a second display substrate. A liquid crystal layer is formed between the first display substrate and the second display substrate.

In an exemplary embodiment, when the display substrate is formed, a gate pattern including a gate line extended in a first direction may be formed on the first base substrate. A data pattern including a data line extended in a second direction crossing the first direction may be formed on the first base substrate including the gate pattern. A first electrode having a first opening portion extended in the first direction may be formed on the first base substrate on which the data pattern is formed. A photoreactive material may be formed on the first electrode. Light may be irradiated onto the photoreactive material disposed on a first side with respect to the first opening portion to form the first alignment part having a first alignment direction. Light may be irradiated onto the photoreactive material disposed on a second side with respect to the first opening portion to form the second alignment part having a second alignment direction.

In an exemplary embodiment, the first and second alignment directions may be different from the first direction, and the first and second alignment directions may be substantially perpendicular to each other.

In an exemplary embodiment, one of the first and second alignment directions may be the same as the first direction, and the first and second alignment directions may be opposite to each other.

In an exemplary embodiment, when the second display substrate is formed, a color filter may be formed on the second base substrate. The second electrode may be formed on the color filter. A photoreactive material may be formed on the color filter. Light may be irradiated onto the photoreactive material facing first end portions of the first and second alignment parts to form a third alignment part having a third alignment direction. Light may be irradiated onto the photoreactive material facing second end portions of the first and second alignment parts to form a fourth alignment part having a fourth alignment direction. One of the third or fourth alignment directions may be the same as the second direction, and the third and fourth alignment directions may be opposite to each other.

In an exemplary embodiment, when the first display substrate is formed, a color filter may be formed on the first base substrate. When the second display substrate is formed, a gate pattern including a gate line extended in a first direction may be formed on the second base substrate. A data pattern may be formed, which includes a data line extended in a second direction crossing the first direction.

In accordance with an exemplary embodiment of the present invention, a display panel is provided. The display panel includes a first display substrate including a first pixel electrode having a first opening portion disposed therethrough, wherein the first pixel electrode having the first opening portion disposed therethrough is disposed on an area including a first domain, a second domain, a third domain and a fourth domain. The first domain, the second domain, the third domain and the fourth domain have a first alignment direction, a second alignment direction, a third alignment direction and a fourth alignment direction, respectively and the first alignment direction, the second alignment direction, the third alignment direction and the fourth alignment direction are perpendicular to each other;

The display panel further includes a second pixel electrode disposed adjacent to the first pixel electrode, a first alignment layer including a first alignment part, a second alignment part, a third alignment part and a fourth alignment part, wherein the first alignment part, the second alignment part, the third alignment part and the fourth alignment parts are disposed on the first alignment layer at a location corresponding to the first domain, the second domain, the third domain and the fourth domain, respectively.

In addition, the display panel further includes a second display substrate including a common electrode facing the first and second pixel electrodes and a liquid crystal layer disposed between the first display substrate and the second display substrate. Liquid crystals of the liquid crystal layer disposed at a location corresponding to the first alignment part, the second alignment part, the third alignment part and the fourth alignment part are aligned in the first alignment direction, the second alignment direction, the third alignment direction and the fourth alignment direction, respectively.

According to a display substrate, a display panel having the display substrate, a method of manufacturing the display substrate and a method of manufacturing the display panel in accordance with an exemplary embodiment of the present invention, a pixel electrode corresponding to plural domains has an opening portion disposed along a boundary of domains adjacent to each other, so that a retardation difference between a front and a side is decreased so that the visibility of a display panel may be increased.

Moreover, alignment directions correspond to first, second, third and fourth domains rotating in a counterclockwise or clockwise direction and a first pixel electrode receiving a high voltage has a first opening portion disposed along a boundary between upper domains and lower domains, so that a retardation difference between a front and a side is decreased so that the visibility of a display panel may be increased.

Moreover, alignment directions correspond to first, second, third and fourth domains rotating in a counterclockwise or clockwise direction and a second pixel electrode receiving a low voltage has a second opening portion disposed along a boundary between left domains and right domains, so that a retardation difference between a front and a side is decreased so that the visibility of a display panel may be increased.

BRIEF DESCRIPTION OF THE DRAWINGS

Exemplary embodiments of the present invention can be understood in more detail from the following detailed description taken in conjunction with the accompanying drawings, in which.

DETAILED DESCRIPTION OF EXEMPLARY EMBODIMENTS OF THE INVENTION

Figure 1:
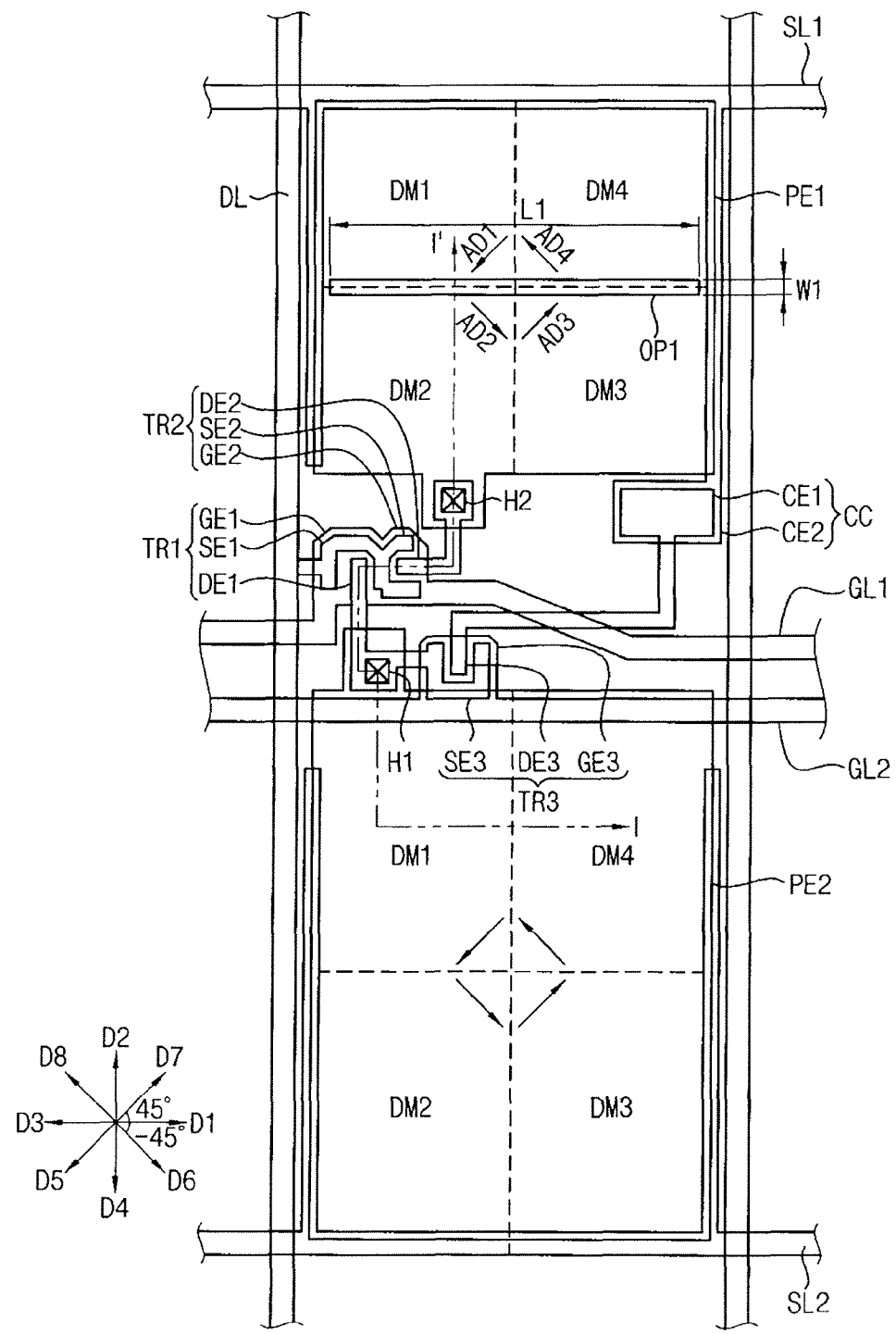
FIG. 1 is a plan view illustrating a display panel according to an exemplary embodiment of the present invention.

Hereinafter, exemplary embodiments of the present invention will be explained in detail with reference to the accompanying drawings.

In the drawings, the thickness of layers, films, panels, regions, etc., may be exaggerated for clarity. It will be understood that when an element such as, for example, a layer, film, region, or substrate is referred to as being "on", "connected to" or "coupled to" another element, it can be directly on, connected to or coupled to the other element or intervening elements may also be present. Like reference numerals designate like elements throughout the specification.

As used herein, the singular forms, "a," "an," and "the" are intended to include plural forms as well, unless the context clearly indicates otherwise.

Figure 2:
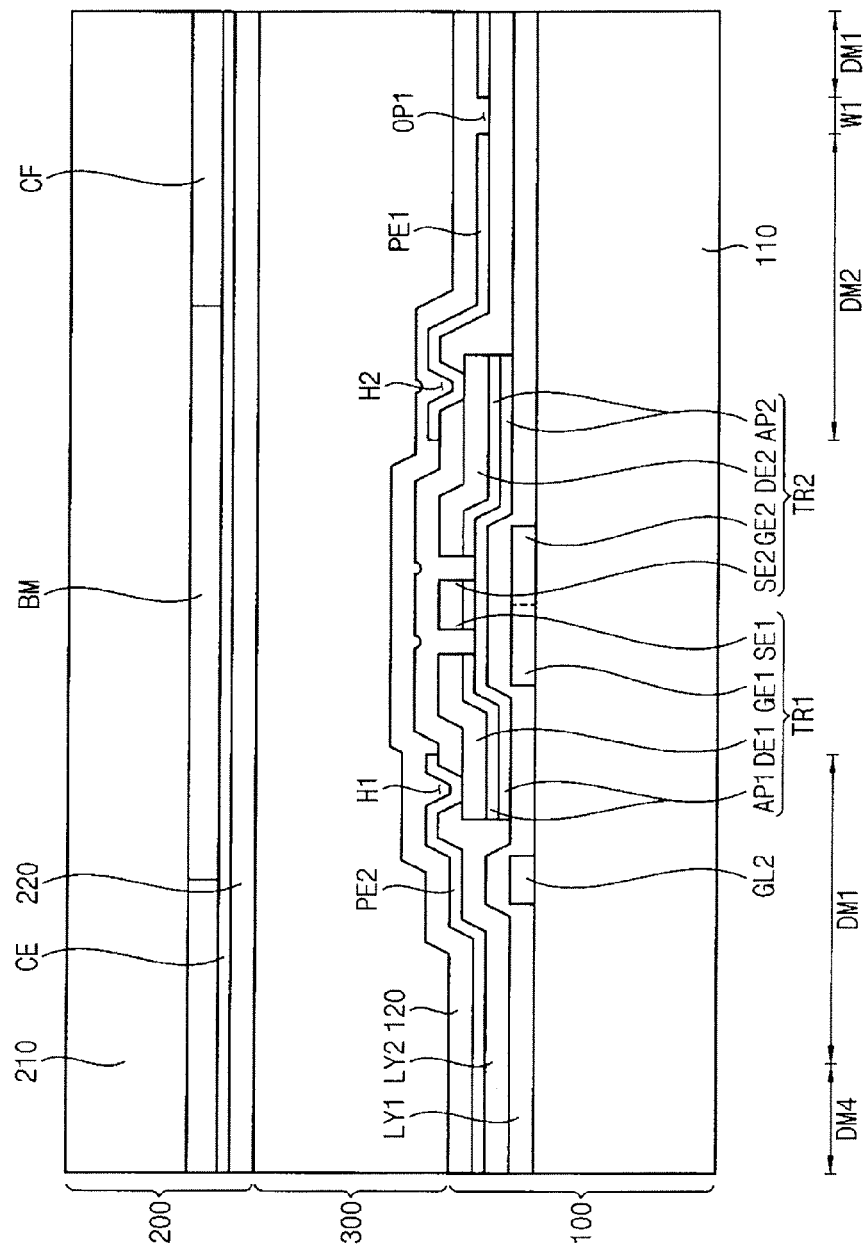
FIG. 2 is a cross-sectional view taken along a line I-I' of FIG. 1.

FIG. 1 is a plan view illustrating a display panel according to an exemplary embodiment of the present invention. FIG. 2 is a cross-sectional view taken along a line I-I' of FIG. 1.

Referring to FIGS. 1 and 2, a display panel according to the present exemplary embodiment includes a first display substrate 100, a second display substrate 200 and a liquid crystal layer 300.

The first display substrate 100 includes, for example, a first base substrate 110 and a plurality of pixel parts disposed on the first base substrate 110. Each of the pixel parts includes, for example, a first gate line GL1, a second gate line GL2, a data line DL, a first switching element TR1, a second switching element TR2, a third switching element TR3, a coupling capacitor CC, a first storage line SL1, a second storage line SL2, a first pixel electrode PE1, a second pixel electrode PE2 and a first alignment layer 120.

The first pixel electrode PE1 and the second pixel electrode PE2 can be formed of the same or different materials from each other. For example, the first pixel electrode PE1 and/or the second pixel electrode PE2 may be made of, a transparent conductive material such as ITO (indium tin oxide), IZO (indium zinc oxide), aluminum zinc oxide (AZO), or cadmium tin oxide (CTO). Alternatively, the first pixel electrode PE1 and/or the second pixel electrode PE2 may be made of, for example, a reflective electric conductor such as aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof.

Each of the pixel parts may further include, for example, a gate insulation layer LY1 and a passivation layer LY2. The gate insulation layer LY1 may be made of, for example, silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

The passivation layer LY2 made of, for example, an inorganic insulating material such as, silicon oxide, silicon nitride or a combination thereof. Alternatively, the passivation layer LY2 may be formed of, for example, an organic material such as benzocyclobutene (BCB), acryl-based resin or a combination thereof.

The first gate line GL1 is extended, for example, in a first direction D1. The second gate line GL2 is extended, for example, in the first direction D1. The data line DL is extended, for example, in a second direction D2 crossing the first direction D1. It is noted that exemplary embodiments of the present invention are not limited to the above positions for the first gate line GL1, the second gate line GL2 and the data line DL. For example, alternatively, the data line DL may be extended in the first direction D1 and the first gate line GL1 and the second gate line GL2 may be extended in the second direction D2 crossing the first direction D1.

The first switching element TR1 includes, for example, a first gate electrode GE1, a first source electrode SE1, a first drain electrode DE1 and a first semiconductor pattern AP1. The first gate electrode GE1 is extended from the first gate line GL1. The first source electrode SE1 is extended from the data line DL. The first drain electrode DE1 is spaced apart from the first source electrode SE1 and is electrically connected to the second pixel electrode PE2. The first semiconductor pattern AP1 is disposed between the first gate and source electrodes GE1 and SE1 and the first drain electrode DE1.

The second switching element TR2 includes, for example, a second gate electrode GE2, a second source electrode SE2, a second drain electrode DE2 and a second semiconductor pattern AP2. The second gate electrode GE2 is extended from the first gate line GL1. The second source electrode SE2 is extended from the first source electrode SE1. The second drain electrode DE2 is spaced apart from the second source electrode SE2 and is electrically connected to the first pixel electrode PE1. The second semiconductor pattern AP2 is disposed between the second gate and source electrodes GE2 and SE2 and the second drain electrode DE2.

The third switching element TR3 includes, for example, a third gate electrode GE3, a third source electrode SE3, a third drain electrode DE3 and a third semiconductor pattern (not shown). The third gate electrode GE3 is extended from the second gate line GL2. The third source electrode SE3 is extended from the first drain electrode DE1. The third drain electrode DE3 is spaced apart from the third source electrode SE3. The third semiconductor pattern is disposed between the third gate and source electrodes GE3 and SE3 and the third drain electrode DE3.

For example, the first gate electrode GE1, the second gate electrode GE2, and the third gate electrode GE3, may be formed of one of aluminum (Al), copper (Cu), molybdenum (Mo), titanium (Ti), nickel (Ni), tungsten (W), gold (Au), palladium (Pd), platinum (Pt), chromium (Cr), neodymium (Nd), zinc (Zn), cobalt (Co) and any mixtures or alloys thereof. In addition, the first gate electrode GE1, the second gate electrode GE2, and the third gate electrode GE3, may include, for example, a transparent conductive material such as an indium tin oxide (ITO), an indium zinc oxide (IZO) and an aluminum doped zinc oxide (AZO).

The first source electrode SE1, the second source electrode SE2, the third source electrode SE3, the first drain electrode DE1, the second drain electrode DE2 and the third drain electrode DE3 may, for example, each be formed of the same materials as the first gate electrode GE1, the second gate electrode GE2, the third gate electrode GE3. Alternatively, for example, the first source electrode SE1, the second source electrode SE2, the third source electrode SE3, the first drain electrode DE1, the second drain electrode DE2 and the third drain electrode DE3 may be formed of different materials from the first gate electrode GE1, the second gate electrode GE2, the third gate electrode GE3.

The coupling capacitor CC includes, for example, a first electrode CE1 and a second electrode CE2. The first electrode CE1 is electrically connected to the third drain electrode DE3. The second electrode CE2 is disposed below the first electrode CE1 and overlaps with the first electrode CE1.

The first, second and third switching elements TR1, TR2 and TR3 and the coupling capacitor CC are disposed, for example, between the first pixel electrode PE1 and the second pixel electrode PE2.

Alternatively, the first, second and third switching elements TR1, TR2 and TR3 and the coupling capacitor CC may be disposed, for example, near one of the first and second pixel electrodes PE1 and PE2.

The first storage line SL1 may be, for example, extended along an edge of the first pixel electrode PE1. The second electrode CE2 is electrically connected to the first storage line SL1.

The second storage line SL2 may be, for example, extended along an edge of the second pixel electrode PE2.

The first pixel electrode PE1 is disposed on an area which includes, for example, at least two domains. In the present exemplary embodiment, it will be described that the first pixel electrode PE1 is disposed on an area which includes, for example, a first domain DM1, a second domain DM2, a third domain DM3 and a fourth domain DM4.

Each of the first to fourth domains DM1, DM2, DM3 and DM4 has, for example, a first alignment direction AD1, a second alignment direction AD2, a third alignment direction AD3 and a fourth alignment direction AD4, respectively. The first, second, third and fourth alignment directions AD1, AD2, AD3 and AD4 are, for example, perpendicular to each other. For example, the first, second, third and fourth alignment directions AD1, AD2, AD3 and AD4 may be rotated in a clockwise or a counterclockwise direction.

For example, a first alignment direction AD1 of the first domain DM1 is parallel with a fifth direction D5 between a third direction D3 opposite the first direction D1 and a fourth direction D4 opposite the second direction D2. The fifth direction D5 is sloped about −45 degrees in a counterclockwise direction with respect to a third direction D3. A second alignment direction AD2 of the second domain DM2 is, for example, parallel with a sixth direction D6 between the first direction D1 and the fourth direction D4. The sixth direction D6 is, for example, sloped about −45 degrees in a counterclockwise direction with respect to the first direction D1. A third alignment direction AD3 of the third domain DM3 is, for example, parallel with a seventh direction D7 between the first direction D1 and the second direction D2. The seventh direction D7 is sloped about +45 degrees in a clockwise direction with respect to the first direction D1. A fourth alignment direction AD4 of the fourth domain DM4 is, for example, parallel with an eighth direction D8 between the second direction D2 and the third direction D3. The eighth direction D8 is, for example, sloped about +45 degrees in a clockwise direction with respect to the third direction D3.

Alternatively, although not shown in FIGS. 1 and 2, the first domain DM1 may have, for example, the third alignment direction AD3, and the second domain DM2 may have the fourth alignment direction AD4. The third domain DM3 may have, for example, the first alignment direction AD1, and the fourth domain DM4 may have the second alignment direction AD2.

Alternatively, although not shown in FIGS. 1 and 2, the first domain DM1 may have, for example, the fourth alignment direction AD4, and the second domain DM2 may have the third alignment direction AD3. The third domain DM3 may have, for example, the second alignment direction AD2, and the fourth domain DM4 may have the first alignment direction AD1.

The first pixel electrode PE1 includes, for example, a first opening portion OP1 disposed along a boundary between adjacent domains.

The first opening portion OP1 is extended, for example, in the first direction D1 along a boundary between the first and fourth domains DM1 and DM4 and the second and third domains DM2 and DM3.

In the present exemplary embodiment, the first opening portion OP1 does not extend to an edge of the first pixel electrode PE1 disposed between the first and fourth domains DM1 and DM4 and the second and third domains DM2 and DM3.

That is, a first length L1 of the first opening portion OP1 along a first direction D1 may be, for example, smaller than a length of the first pixel electrode PE1 along the first direction D1. Thus, a whole of the first pixel electrode PE1 may receive a voltage from the first switching element TR1.

A first width W1 of the first opening portion OP1 along a second direction D2 may be, for example, about 2 µm to about 4.5 µm. When the first width W1 is about 2 µm to 4.5 µm, the first pixel electrode PE1 may increase the visibility of a display panel without decreasing the light transmittance of the display panel.

The first pixel electrode PE1 having the first opening portion OP1 may form a fringe field at a boundary between the first and fourth domains DM1 and DM4 and the second and third domains DM2 and DM3.

When the first width W1 is greater than about 6 µm, the strength of a fringe field may be great at a boundary between the first and fourth domains DM1 and DM4 and the second and third domains DM2 and DM3 so that the visibility may be decreased. Moreover, the light transmittance of a display panel may be decreased.

The second pixel electrode PE2 is disposed, for example, adjacent to the first pixel electrode PE1. The second pixel electrode PE2 may be disposed on an area which includes, for example, at least two domains. For example, the second pixel electrode PE2 may be disposed on an area which includes domains substantially identical to the first, second, third, and fourth domains DM1, DM2, DM3, and DM4 described above in connection with the first pixel electrode PE1.

The second pixel electrode PE2 may display, for example, a same gradation as the first pixel electrode PE1. For example, when the first gate line GL1 is driven, the same voltage as the first pixel electrode PE may be applied to the second pixel electrode PE2. However, when the second gate line GL2 is driven, a voltage may be divided by the coupling capacitor CC so that a divided voltage different from a voltage of the first pixel electrode PE1 may be applied to the second pixel electrode PE2. That is, a voltage lower than a voltage applied to the first pixel electrode PE1 may be applied to the second pixel electrode PE2.

The first alignment layer 120 includes, for example, alignment parts disposed on an area including at least two domains. For example, in the present exemplary embodiment, the first alignment layer 120 may include a first alignment part 121, a second alignment part 122, a third alignment part 123 and a fourth alignment part 124") which are formed on the first alignment layer 120 at a location corresponding to the first, second, third and fourth domains DM1, DM2, DM3 and DM4, respectively, as illustrated in FIGS. 3A-3D. The first alignment part 121, the second alignment part 122, the third alignment part 123 and the fourth alignment part 124 will each be described in more detail hereinafter, e.g. in connection with FIGS. 3A-D.

For example, the first and fourth alignment parts 121, 124 are disposed at a first side of the first opening portion OP1, and the second and third alignment parts 122, 123 are disposed at a second side of the first opening portion OP1.

The second display substrate 200 includes, for example, a second base substrate 210 and a common electrode CE. The second display substrate 200 may further include, for example, a light-blocking pattern BM, a color filter CF and a second alignment layer 220. Each of the color filters CF may have, for example, one of the three primary colors such as red, green or blue.

The common electrode CE is disposed, for example, on the second base substrate 210. The common electrode CE faces the first and second pixel electrodes PE1 and PE2. Moreover, the common electrode CE may be made of, for example, a transparent conductive material such as ITO (indium tin oxide), IZO (indium zinc oxide), aluminum zinc oxide (AZO), or cadmium tin oxide (CTO).

The light-blocking pattern BL and the color filter CF may be disposed, for example, below the common electrode CE. Alternatively, the light-blocking pattern BM and the color filter CF may be, for example, included in the first display substrate 100.

The second alignment layer 220 is disposed on, for example, the common electrode CE. Alternatively, the second alignment layer 220 may be omitted.

The liquid crystal layer 300 is disposed between the first display substrate 100 and the second display substrate 200.

For example, liquid crystals of the liquid crystal layer 300 corresponding to the first alignment part 121 are aligned in the first alignment direction AD1, and liquid crystals of the liquid crystal layer 300 corresponding to the second alignment part 122 are aligned in the second alignment direction AD2. Moreover, liquid crystals of the liquid crystal layer 300 corresponding to the third alignment part 123 are aligned in the third alignment direction AD3, and liquid crystals of the liquid crystal layer 300 corresponding to the fourth alignment part 124 are aligned in the fourth alignment direction AD4.

Liquid crystals corresponding to a boundary between the first alignment part 121 and the second alignment part 122 may be, for example, aligned in a fourth direction D4 which is substantially perpendicular to the first direction D1 and is opposite the second direction D2. Liquid crystals corresponding to a boundary between the third alignment part 123 and the fourth alignment part 124 may be, for example, aligned in the second direction D2 which is substantially perpendicular to the first direction D1.

Accordingly, retardation corresponding to a side surface is increased at a boundary between the first and fourth alignment parts 121 and 124 and the second and third alignment parts 122 and 123, so that the visibility of a display panel may be decreased.

However, liquid crystals aligning in the second direction D2 or the fourth direction D4 may be decreased at a boundary between the first and fourth alignment parts 121 and 124 and the second and third alignment parts 122 and 123, so that retardation corresponding to a side surface may be increased. Thus, the visibility of the display panel of FIG. 1 may be increased.

Hereinafter, a method of manufacturing a display panel will be explained in detail with reference to FIG. 2.

A gate pattern, which includes, for example, the first and second gate lines GL1 and GL2, the first, second and third gate electrodes GE1, GE2 and GE3, a second electrode CE2 of the coupling capacitor CC, the first storage line SL1 and the second storage line SL2, is formed on the first base substrate 110.

The gate insulation layer LY1 is formed on the first base substrate 110 having the gate pattern formed thereon.

The first, second and third semiconductor patterns AP1 and AP2 and a data pattern are formed on the gate insulation layer LY1. The data pattern includes, for example, the data line DL, the first, second and third source electrodes SE1, SE2 and SE3, the first, second and third drain electrodes DE1, DE2 and DE3 and a first electrode CE1 of the coupling capacitor CC.

The data pattern is formed on the first, second and third semiconductor patterns AP1 and AP2. The first, second and third semiconductor patterns AP1 and AP2 and the data pattern may be formed by, for example, one mask or plural masks.

The passivation layer LY2 is formed on the first base substrate 110 wherein the data pattern is formed.

The passivation layer LY2 is patterned to form, for example, a first contact hole H1 partially exposing the first drain electrode DE1 and a second contact hole H2 partially exposing the second drain electrode DE2.

A transparent pattern including, for example, the first pixel electrode PE1 and the second pixel electrode PE2 is formed on the passivation layer LY2 having the first and second contact holes H1 and H2 formed therethrough. The first opening portion OP1 is formed through the first pixel electrode PE1.

The first pixel electrode PE1 is electrically connected to the second drain electrode DE2 through the second contact hole H2, and the second pixel electrode PE2 is electrically connected to the first drain electrode DE1 through the first contact hole H1.

A first alignment layer 120 including, for example, a photoreactive material is formed on the transparent pattern. Lights are irradiated onto the first alignment layer to form, for example, the first, second, third and fourth alignment parts having the different alignment directions from each other.

FIGS. 3A to 3D are perspective views explaining a forming method of a first alignment layer.

Figure 3A:
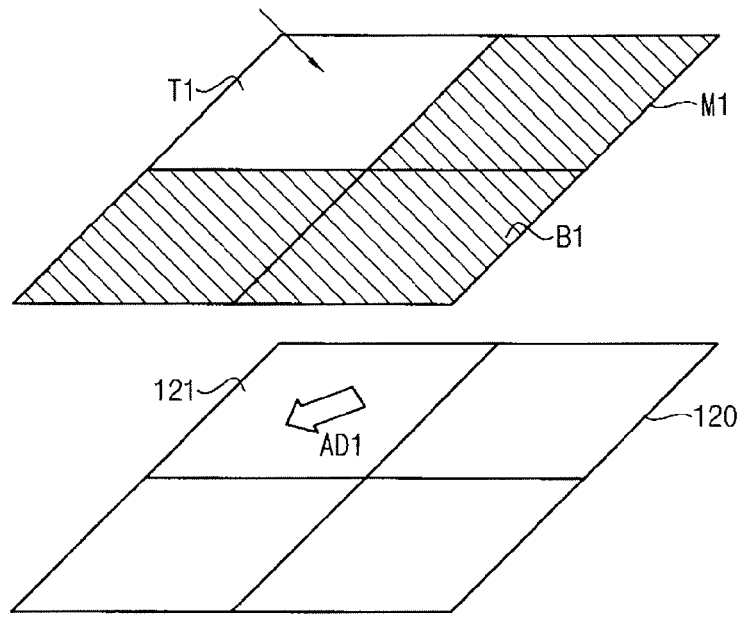
FIGS. 3A to 3D are perspective views explaining a forming method of a first alignment layer.

Referring to FIG. 3A, a first mask M1 is disposed on the first alignment layer 120 to irradiate lights onto the first mask M1. The first mask M1 includes, for example, a first light-transmitting portion T1 configured for transmitting lights and a first light-blocking portion B1 configured for blocking lights. The first light-transmitting portion T1 corresponds to the first domain DM1, and the first light-blocking portion B1 corresponds to the second, third and fourth domains DM2, DM3 and DM4. Thus, a first alignment part 121 corresponding to the first light-transmitting portion T1 is formed on the first alignment layer 120. The first alignment part 121 may have the first alignment direction AD1.

Figure 3B:
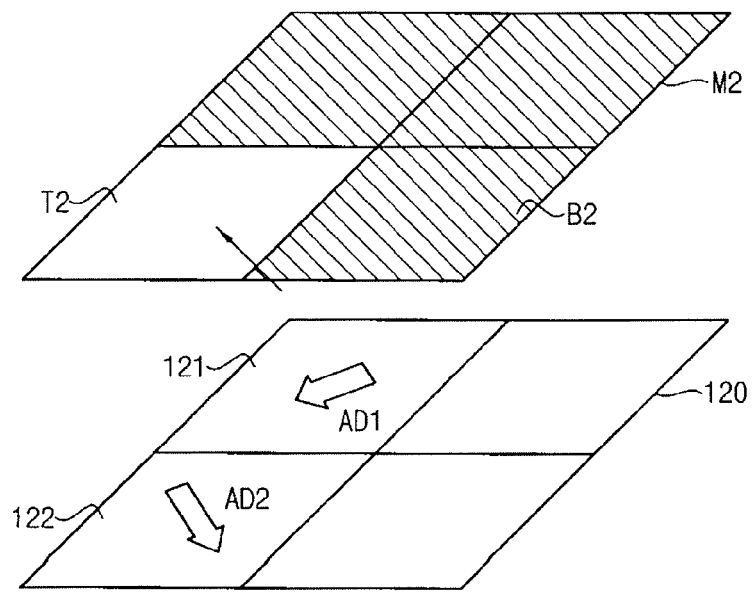

Referring to FIG. 3B, a second mask M2 is disposed on the first alignment layer 120 on which the first alignment part 121 is formed to irradiate lights onto the second mask M2. The second mask M2 includes, for example, a second light-transmitting portion T2 configured for transmitting lights and a second light-blocking portion B2 configured for blocking lights. The second light-transmitting portion T2 corresponds to the second domain DM2, and the second light-blocking portion B2 corresponds to the first, third and fourth domains DM1, DM3 and DM4. Thus, a second alignment part 122 corresponding to the second light-transmitting portion T2 is formed on the first alignment layer 120. The second alignment part 122 may have the second alignment direction AD2.

Figure 3C:
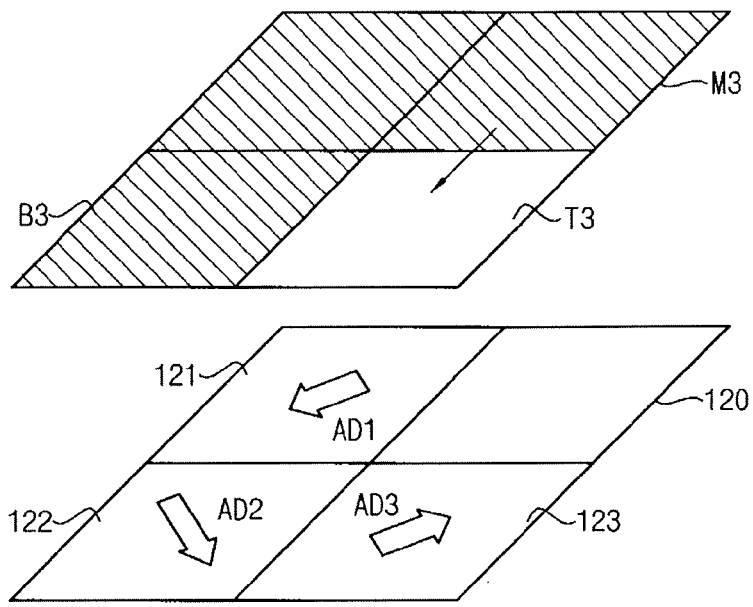

Referring to FIG. 3C, a third mask M3 is disposed on the first alignment layer 120 on which the first and second alignment parts 121 and 122 are formed to irradiate lights onto the third mask M3. The third mask M3 includes, for example, a third light-transmitting portion T3 configured for transmitting lights and a third light-blocking portion B3 configured for blocking lights. The third light-transmitting portion T3 corresponds to the third domain DM3, and the third light-blocking portion B3 corresponds to the first, second and fourth domains DM1, DM2 and DM4. Thus, a third alignment part 123 corresponding to the third light-transmitting portion T3 is formed on the first alignment layer 120. The third alignment part 123 may have the third alignment direction AD3.

Figure 3D:
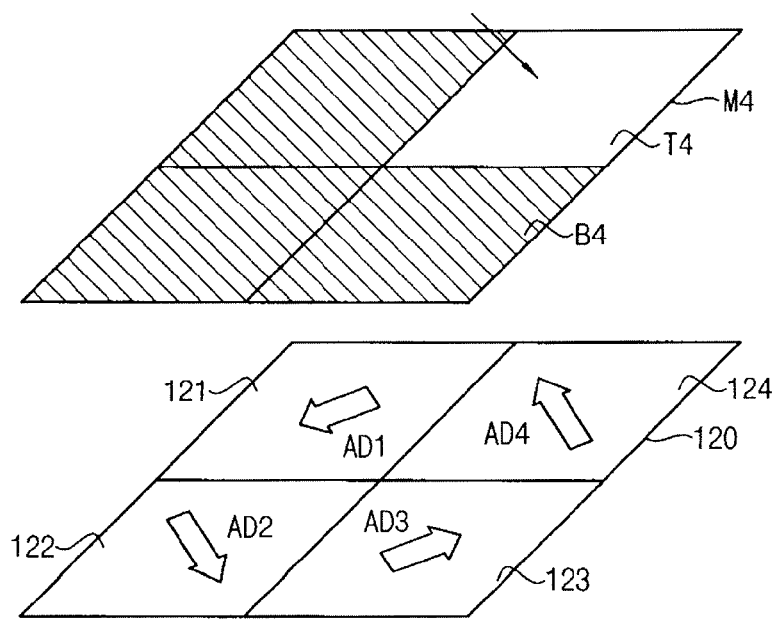

Referring to FIG. 3D, a fourth mask M4 is disposed on the first alignment layer 120 on which the first, second and third alignment layers 121, 122 and 123 are formed to irradiate lights onto the fourth mask M4. The fourth mask M4 includes, for example, a fourth light-transmitting portion T4 configured for transmitting lights and a fourth light-blocking portion B4 configured for blocking lights. The fourth light-transmitting portion T4 corresponds to the fourth domain DM4, and the fourth light-blocking portion B4 corresponds to the first, second and third domains DM1, DM2 and DM3. Thus, a fourth alignment part 124 corresponding to the fourth light-transmitting portion T4 is formed on the first alignment layer 120. The fourth alignment part 124 may have the fourth alignment direction AD4.

In the present exemplary embodiment, the first, second, third and fourth alignment directions AD1, AD2, AD3 and AD4 are, for example, different from each other. The first, second, third and fourth alignment directions AD1, AD2, AD3 and AD4 may be aligned in a counterclockwise or a clockwise direction. Alignment directions between the domains adjacent to each other may be, for example, perpendicular to each other.

Referring again to FIG. 2, a light-blocking pattern BM and a color filter CF are formed on the second base substrate 210.

The common electrode CE is formed on the color filter CF. The second alignment layer 220 is formed on the common electrode CE. Alternatively, for example, the light-blocking pattern BM and the color filter CF may instead be included in the first display substrate 100 and the second alignment layer 220 may be omitted.

The second display substrate 200 is combined with the first display substrate 100. Liquid crystals are, for example, injected between the first display substrate 100 and the second display substrate 200 to form the liquid crystal layer 300. The liquid crystals are aligned along the first, second, third and fourth alignment directions AD1, AD2, AD3 and AD4 of the first, second, third and fourth alignment parts 121, 122, 123 and 124.

Alternatively, liquid crystals are, for example, dropped on one of the first display substrate 100 and the second display substrate 200. One of the first and second display substrates 100 and 200 is combined with a remaining of the first and second display substrates 100 and 200. The liquid crystals are aligned along the first, second, third and fourth alignment directions AD1, AD2, AD3 and AD4 of the first, second, third and fourth alignment parts 121, 122, 123 and 124.

According to the present exemplary embodiment, the first opening portion OP1 may prevent liquid crystals from being aligned in the second and fourth directions D2 and D4 vertical to a boundary between the first and third domains DM1 and DM3 and the first and fourth domains DM2 and DM4 by using a fringe field, thereby reducing retardation at a side of a display panel. For example, a retardation difference between a front and a side at a low gradation area may be reduced, thereby increasing the visibility of an image.

FIGS. 4A to 4D are perspective views explaining a forming method of a first alignment layer and a second alignment layer of a display panel according to an exemplary embodiment of the present invention.

The display panel according to the present exemplary embodiment is, for example, substantially the same as the display panel shown in FIG. 1 except for a method for forming a first alignment layer and a second alignment layer. Elements shown in FIGS. 4A to 4D which are the same or like the elements shown in FIG. 1 have been labeled in FIGS. 4A to 4D with the same reference characters as used above to describe these elements in connection with the display panel shown in FIG. 1, and any repetitive detailed description thereof will hereinafter be omitted.

Figure 4A:
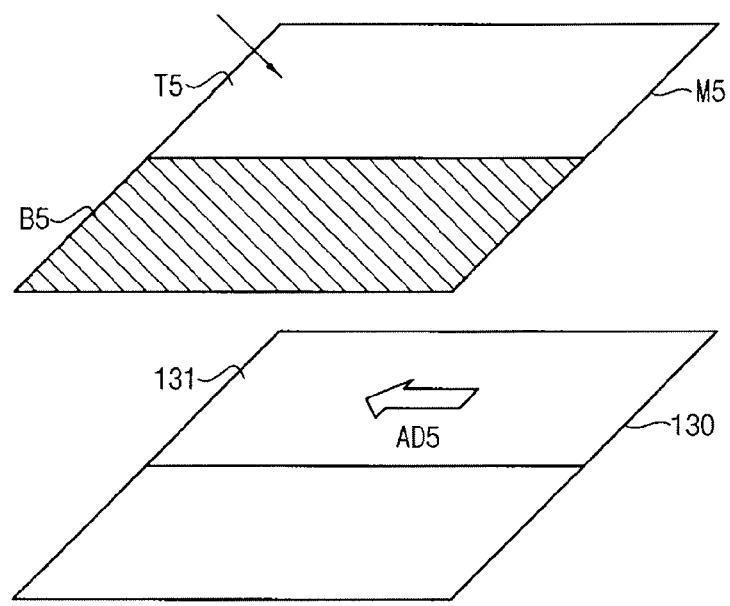
FIGS. 4A to 4D are perspective views explaining a forming method of a first alignment layer and a second alignment layer of a display panel according to an exemplary embodiment of the present invention.

Referring to FIG. 4A, a first mask M5 is disposed on a first alignment layer 130 having a photoreactive material to irradiate lights onto the first mask M5. The first mask M5 includes, for example, a first light-transmitting portion T5 configured for transmitting lights and a first light-blocking portion B5 configured for blocking lights. The first light-transmitting portion T5 corresponds to the first and third domains DM1 and DM3, and the first light-blocking portion B5 corresponds to the second and fourth domains DM2 and DM4. Thus, a first alignment part 131 corresponding to the first light-transmitting portion T5 is formed on the first alignment layer 130. The first alignment part 131 may have a fifth alignment direction AD5. The fifth alignment direction AD5 may be the same as the third direction D3 opposite to the first direction D1 in which a gate line GL is extended.

Figure 4B:
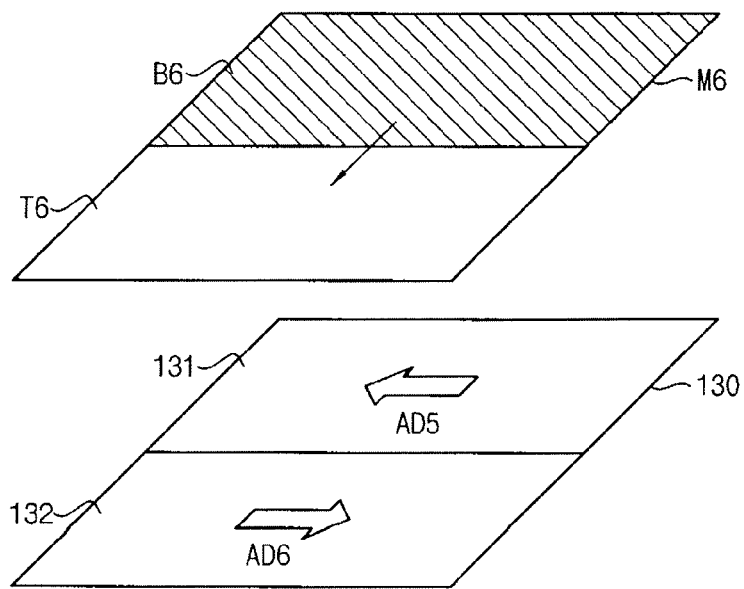

Referring to FIG. 4B, a second mask M6 is disposed on the first alignment layer 130 on which the first alignment part 131 is formed to irradiate lights onto the second mask M6. The second mask M6 includes, for example, a second light-transmitting portion T6 configured for transmitting lights and a second light-blocking portion B6 configured for blocking lights. The second light-transmitting portion T6 corresponds to the second and fourth domains DM2 and DM4, and the second light-blocking portion B6 corresponds to the first and third domains DM1 and DM3. Thus, a second alignment part 132 corresponding to the second light-transmitting portion T6 is formed on the first alignment layer 130. The second alignment part 132 may have a sixth alignment direction AD6. The sixth alignment direction AD6 may be the same as the first direction D1.

Figure 4C:
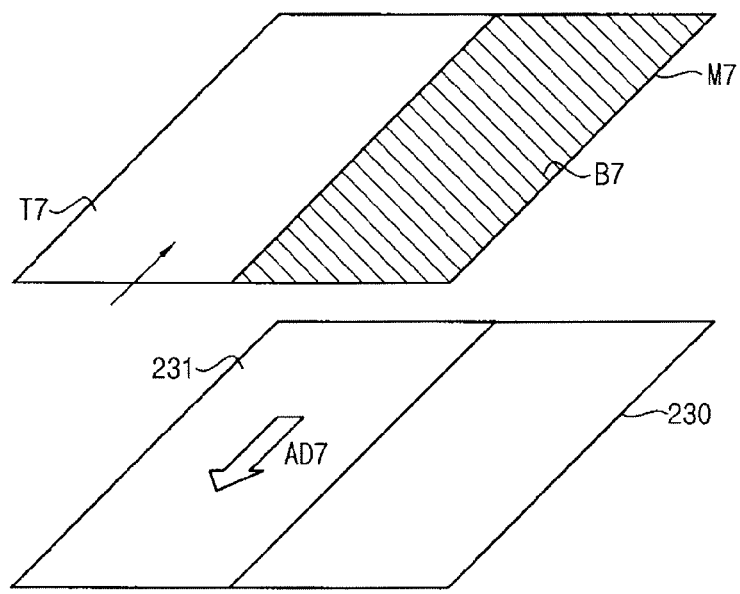

Referring to FIG. 4C, a third mask M7 is disposed on a second alignment layer 230 having a photoreactive material to irradiate lights onto the third mask M7. The third mask M7 includes, for example, a third light-transmitting portion T7 configured for transmitting lights and a third light-blocking portion B7 configured for blocking lights. The third light-transmitting portion T7 corresponds to the first and second domains DM1 and DM2, and the third light-blocking portion B7 corresponds to the third and fourth domains DM3 and DM4. Thus, a third alignment part 231 corresponding to the third light-transmitting portion T7 is formed on the second alignment layer 230. The third alignment part 231 may have a seventh alignment direction AD7. The seventh alignment direction AD7 may be the same as the fourth direction D4 opposite to the second direction D2 in which a data line DL is extended.

The third alignment part 231 corresponds to first end portions of the first and second alignment parts 131 and 132.

Figure 4D:
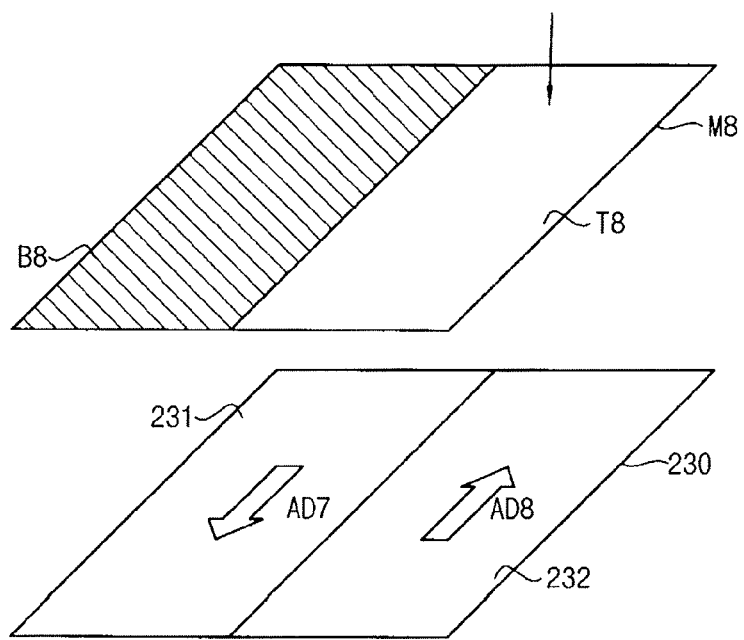

Referring to FIG. 4D, a fourth mask M8 is disposed on the second alignment layer 230 on which the third alignment part 231 is formed to irradiate lights onto the fourth mask M8. The fourth mask M8 includes, for example, a fourth light-transmitting portion T8 configured for transmitting lights and a fourth light-blocking portion B8 configured for blocking lights. The fourth light-transmitting portion T8 corresponds to the third and fourth domains DM3 and DM4, and the fourth light-blocking portion B8 corresponds to the first and second domains DM1 and DM2. Thus, a fourth alignment part 232 corresponding to the fourth light-transmitting portion T8 is formed on the second alignment layer 230. The fourth alignment part 232 may have an eighth alignment direction AD8. The eighth alignment direction AD8 may be the same as the second direction.

The fourth alignment part 232 corresponds to second end portions of the first and second alignment parts 131 and 132 opposite to first end portions of the first and second alignment parts 131 and 132.

Thus, when the first display substrate 100 including the first alignment layer 130 is combined with the second display substrate 200 including the second alignment layer 230, the fifth and sixth alignment directions AD5 and D6 and the seventh and eighth alignment directions AD7 and AD8 may form a vector sum to form first, second, third and fourth alignment directions AD1, AD2, AD3 and AD4 according to the display panel of FIG. 1. Thus, first, second, third and fourth domains DM1, DM2, DM3 and DM4 corresponding to the first, second, third and fourth alignment directions AD1, AD2, AD3 and AD4 are formed.

A first alignment layer 130 including, for example, the first and second alignment parts 131 and 132 is formed and a second alignment layer 230 including the third and fourth alignment parts 231 and 232 is formed, thereby readily forming the first and second alignment layers 130 and 230.

Figure 5:
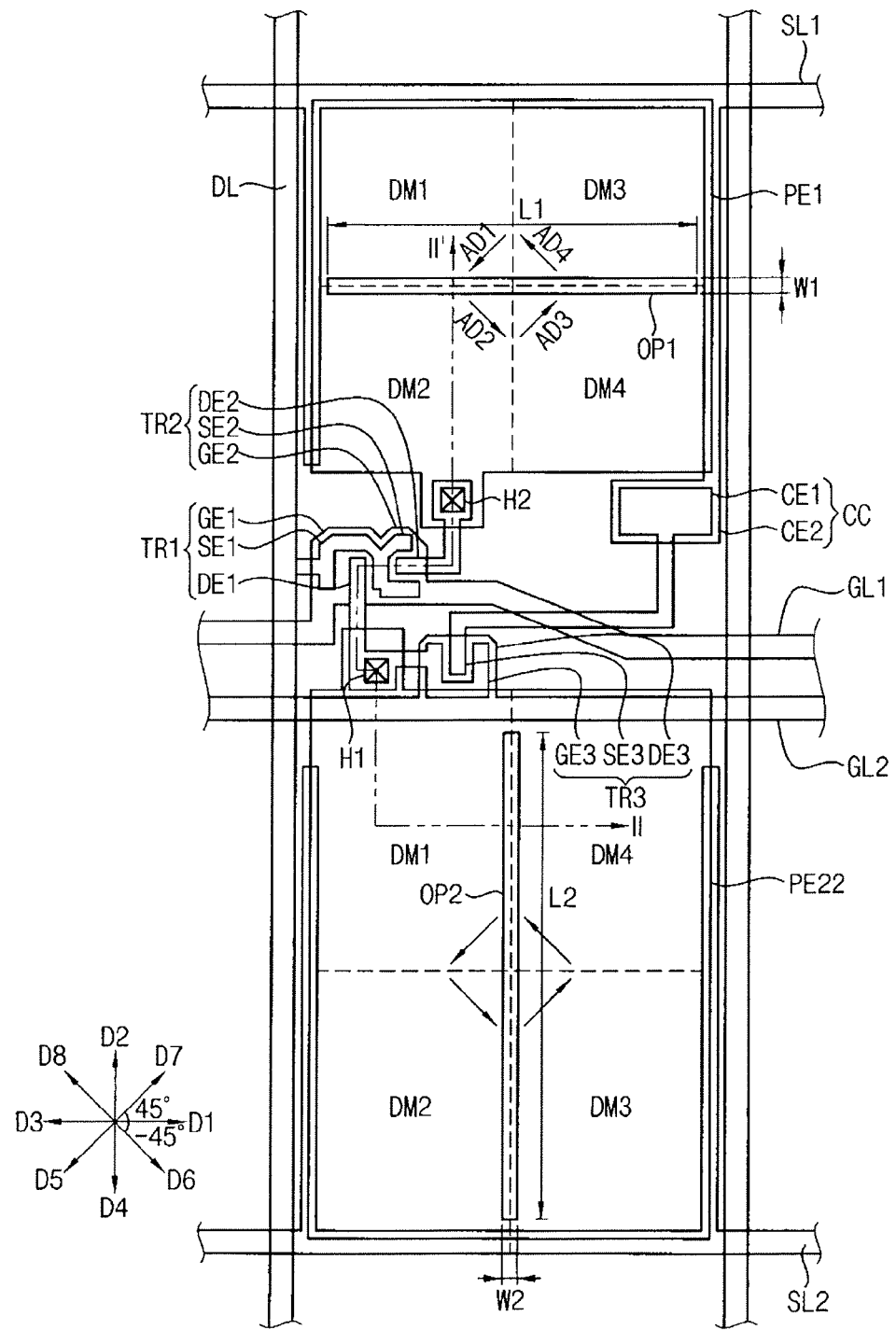
FIG. 5 is a plan view illustrating a display panel according to an exemplary embodiment of the present invention.
Figure 6:
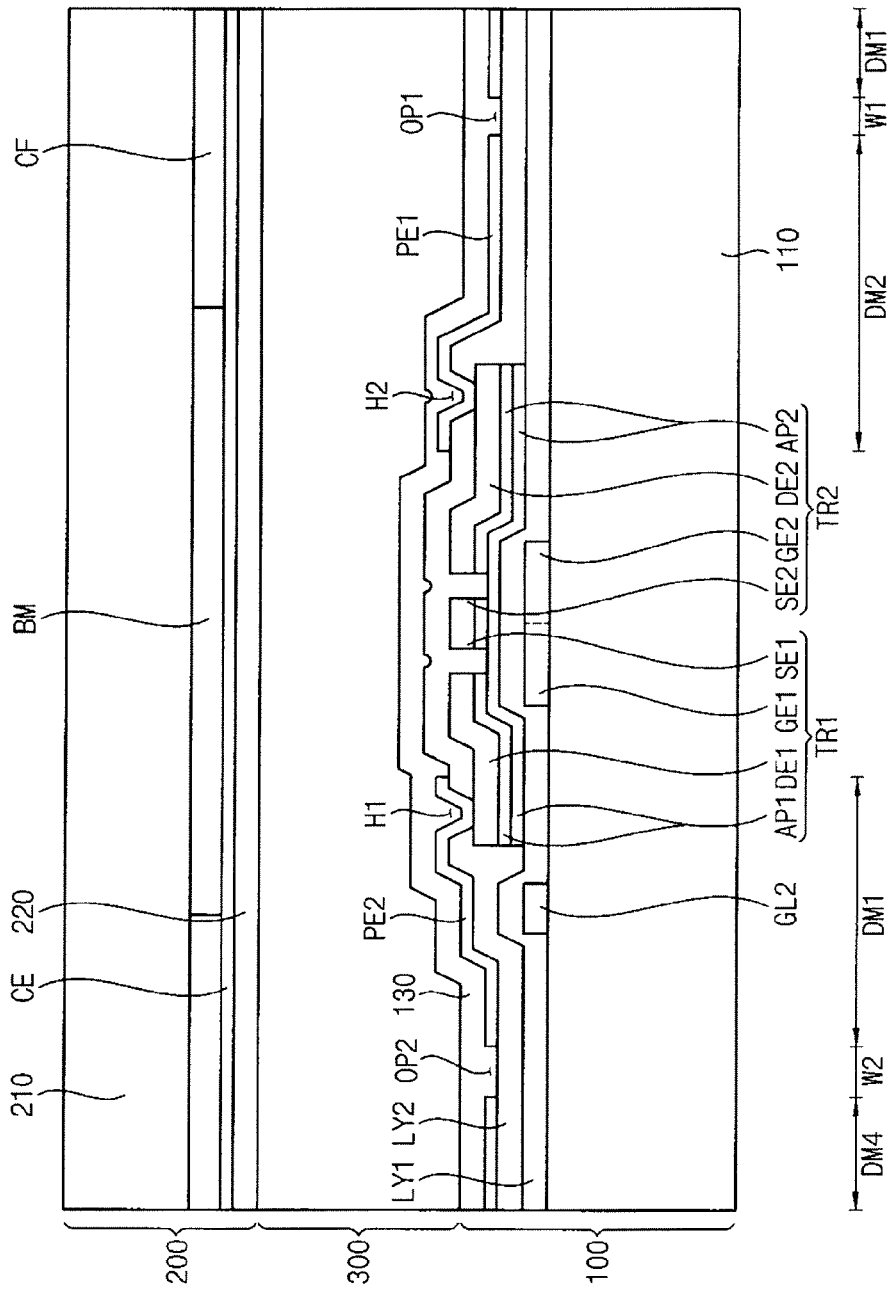
FIG. 6 is a cross-sectional view taken along a line II-II' of FIG. 5.

FIG. 5 is a plan view illustrating a display panel according to an exemplary embodiment of the present invention. FIG. 6 is a cross-sectional view taken along a line II-II' of FIG. 5.

The display panel according to the present exemplary embodiment is, for example, substantially the same as the display panel shown in FIG. 1 except for a second pixel electrode. Elements shown in FIGS. 5 and 6 which are like or the same as elements shown in FIG. 1 have been labeled in FIGS. 5 and 6 with the same reference characters as used above to describe these elements in connection with the display panel shown in FIG. 1, and any repetitive detailed description thereof will hereinafter be omitted.

Referring to FIGS. 5 and 6, a second pixel electrode PE22 has, for example, a second opening portion OP2 corresponding to a boundary between adjacent domains.

The second opening portion OP2 is extended, for example, in a second direction D2 along a boundary between the first and second domains DM1 and DM2 and the third and fourth domains DM3 and DM4.

In the present exemplary embodiment, the second opening portion OP2 does not extend to an edge of the second pixel electrode P22 disposed between the first and fourth domains DM1 and DM4 and the second and third domains DM2 and DM3.

That is, a second length L2 of the second opening portion OP2 along a second direction D2 may be, for example, smaller than a length of the second pixel electrode PE2 along the second direction D2. Thus, a whole of the second pixel electrode PE2 may receive a voltage from the second switching element TR2.

A second width W2 of the second opening portion OP2 along a first direction D1 may be, for example, about 2 μm to about 4.5 μm. Thus, the second pixel electrode PE22 may increase the visibility of a display panel without decreasing a light transmittance of a display device.

The second pixel electrode PE2 having the second opening portion OP2 may form a fringe field at a boundary between the first and second domains DM1 and DM2 and the third and fourth domains DM3 and DM4.

Liquid crystals corresponding to a boundary between the first alignment part 121 and the fourth alignment part 124 may be aligned, for example, in an eighth direction D8 which is substantially perpendicular to the second direction D2 and is opposite the first direction D1. Liquid crystals corresponding to a boundary between the second alignment part 122 and the third alignment part 123 may be aligned, for example, in the first direction D1 which is substantially perpendicular to the second direction D2.

Accordingly, retardation corresponding to a front surface may be increased at a boundary between the first and second alignment parts 121 and 122 and the third and fourth alignment parts 123 and 124, so that the visibility may be decreased.

However, liquid crystals aligning in the first direction D1 or the third direction D3 may be decreased at a boundary between the first and second alignment parts 121 and 122 and the third and fourth alignment parts 123 and 124, so that retardation corresponding to a front surface is decreased. Thus, the visibility of a display panel may be increased. For example, a retardation difference between a front and a side at a high gradation area may be decreased, so that the visibility of a display panel may be increased.

Figure 7:
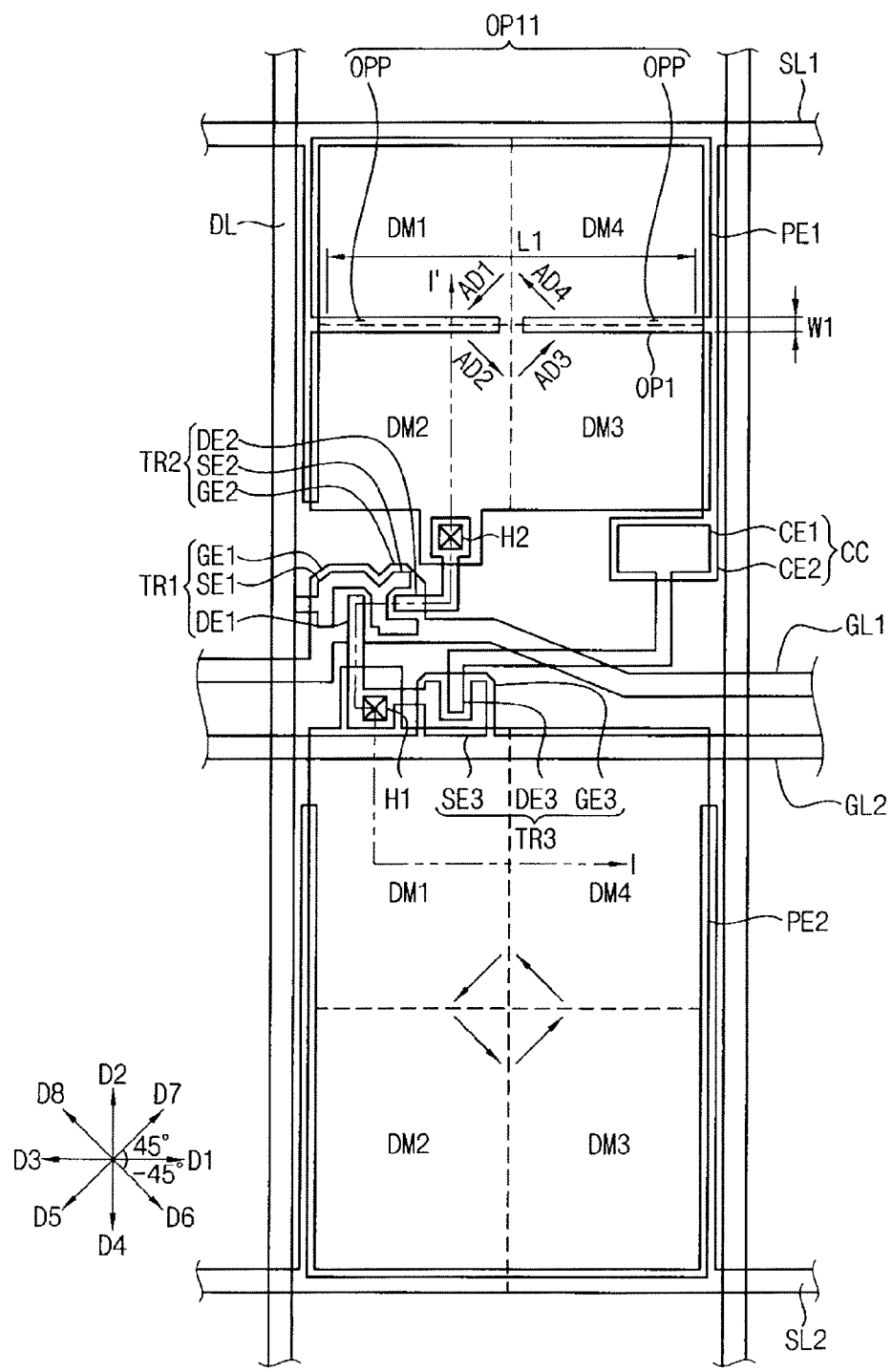
FIG. 7 is a cross-sectional view of a display panel according to an exemplary embodiment of the present invention.

FIG. 7 is a cross-sectional view of a display panel according to an exemplary embodiment of the present invention.

The display panel according to the present exemplary embodiment is, for example, substantially the same as the display panel shown in FIG. 1 except for a shape of a first opening portion. Elements shown in FIG. 7 which are the same or like the elements shown in FIG. 1 have been labeled in FIG. 7 with the same reference characters as used above to describe these elements in connection with the display panel shown in FIG. 1, and any repetitive detailed description thereof will hereinafter be omitted.

For example, referring to FIG. 7, a first opening portion OP11 is extended in the first direction D1 along a boundary between the first and fourth domains DM1 and DM4 and the second and third domains DM2 and DM3.

In the present exemplary embodiment, the first opening portion OP11 is, for example, not positioned on a center portion of the first pixel electrode PE1 disposed at the boundary between the first and fourth domains DM1 and DM4 and the second and third domains DM2 and DM3.

The first opening portion OP11 may include, for example, a first sub-opening portion OPP1 and a second sub-opening portion OPP2. The first sub-opening portion OPP1 is disposed along a boundary between the first domain DM1 and the second domain DM2, and the second sub-opening portion OPP2 is disposed along a boundary between the third domain DM3 and the fourth domain DM4.

That is, a first length L1 of the first opening portion OP11 along a first direction D1 may be, for example, smaller than a length of the first pixel electrode PE1 along the first direction D1. Thus, a whole of the first pixel electrode PE1 may receive a voltage from the first switching element TR1.

Thus, the visibility of the display panel may be increased without decreasing the light transmittance of the display panel.

Figure 8:
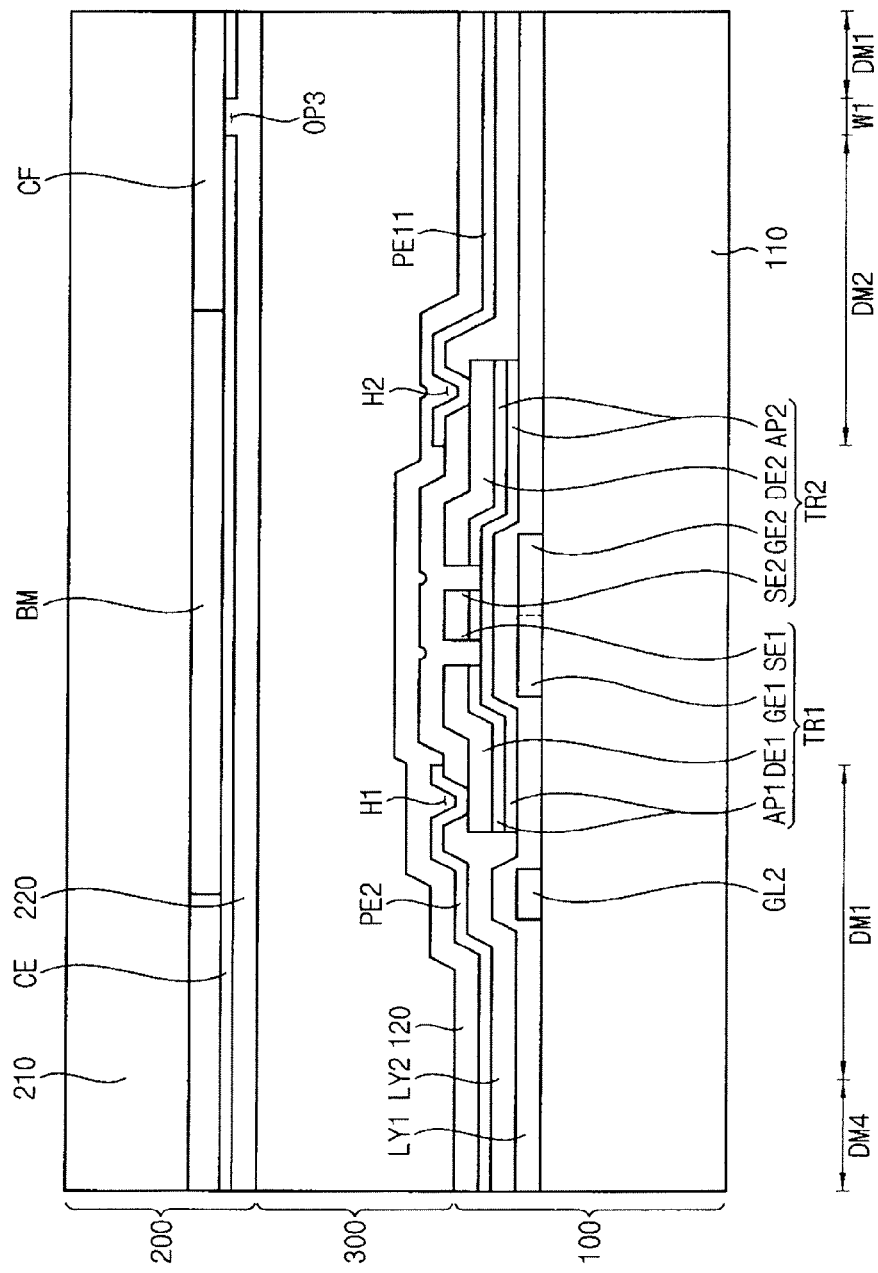
FIG. 8 is a cross-sectional view of a display panel according to an exemplary embodiment of the present invention.

FIG. 8 is a cross-sectional view of a display panel according to an exemplary embodiment of the present invention.

The display panel according to the present exemplary embodiment is, for example, substantially the same as the display panel shown in FIG. 1 except for a first pixel electrode and a common electrode. Elements shown in FIG. 8 which are the same or like elements shown in FIG. 1 have been labeled in FIG. 8 with the same reference characters as used above to describe these elements in connection with the display panel shown in FIG. 1, and any repetitive detailed description thereof will hereinafter be omitted.

Referring to FIG. 8, a first pixel electrode PE11 according to the present exemplary embodiment is disposed on an area which includes, for example, at least two domains. The first pixel electrode PE11 is disposed on an area which includes, for example, a first domain DM1, a second domain DM2, a third domain DM3 and a fourth domain DM4.

A common electrode CE according to the present exemplary embodiment is formed at a location including at least two domains. The common electrode CE is formed at a location including, for example, t a first domain DM1, a second domain DM2, a third domain DM3 and a fourth domain DM4.

The common electrode CE has, for example, a third opening portion OP3 formed therethrough in correspondence with a boundary between adjacent domains.

The third opening portion OP3 is extended, for example, in the first direction D1 along a boundary between the first and fourth domains DM1 and DM4 and the second and third domains DM2 and DM3.

The third opening portion OP3 is, for example, overlapped with the first pixel electrode PE11. That is, the third opening portion OP3 is disposed, for example, between data lines DL adjacent to each other.

A first length L1 of the third opening portion OP3 along a first direction D1 may be, for example, smaller than a length of the first pixel electrode PE11 along the first direction D1. That is, the first length L1 of the third opening portion OP3 along the first direction D1 may be smaller than a gap between the data lines DL adjacent to each other. Thus, the third opening portion OP3 of adjacent pixel parts P may be spaced apart from each other.

Thus, the visibility of a display panel may be increased without decreasing the light transmittance of the display panel.

Figure 9:
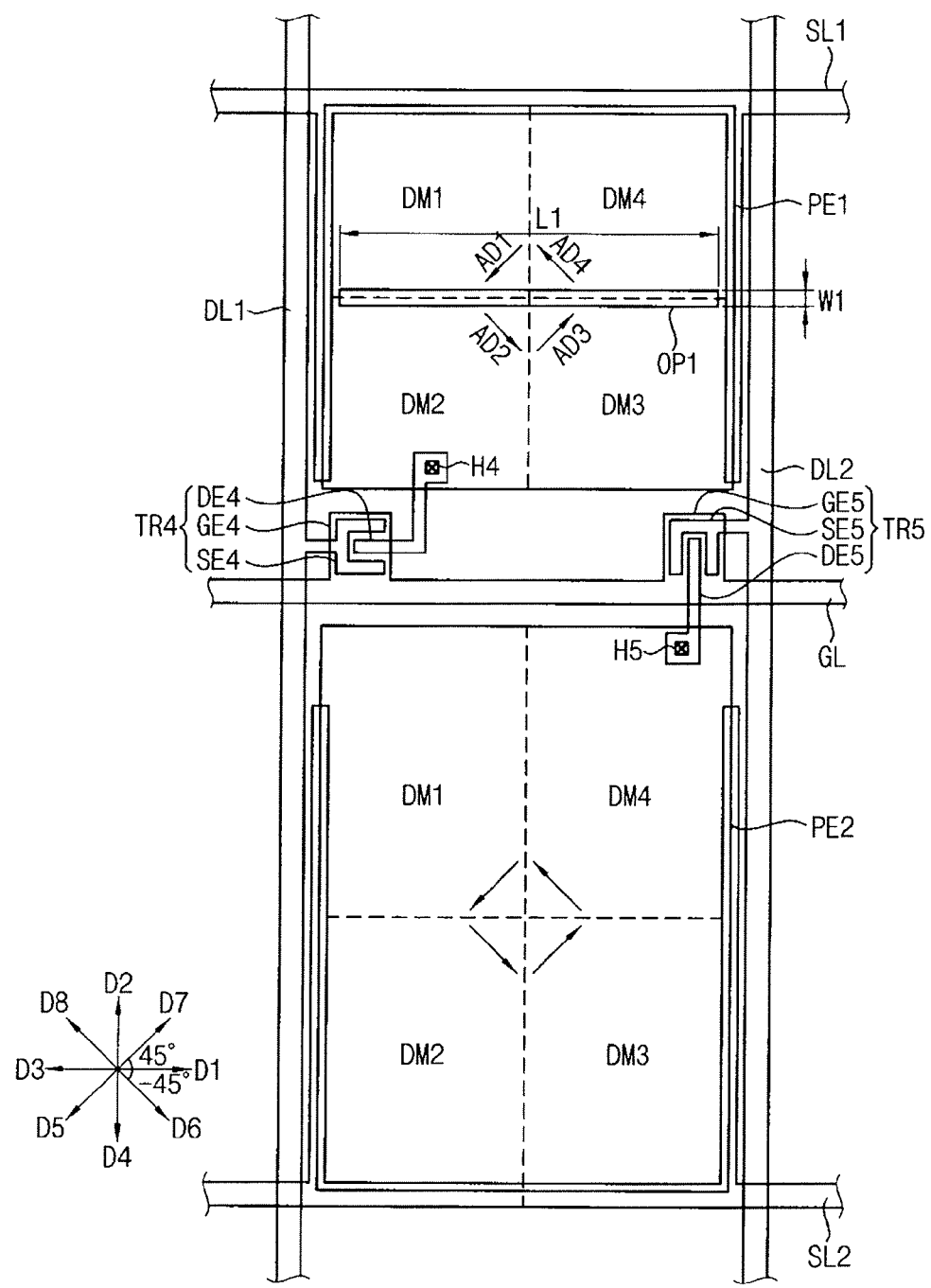
FIG. 9 is a cross-sectional view of a display panel according to an exemplary embodiment of the present invention.

FIG. 9 is a cross-sectional view of a display panel according to an exemplary embodiment of the present invention.

The display panel according to the present exemplary embodiment is substantially the same as, for example, the display panel shown in FIG. 1 except for a pixel part. Elements shown in FIG. 9 which are the same or like elements shown in FIG. 1 have been labeled in FIG. 9 with the same reference characters as used above to describe these elements in connection with the display panel shown in FIG. 1, and any repetitive detailed description thereof will hereinafter be omitted.

Referring to FIG. 9, a pixel part of a first display substrate according to the present exemplary embodiment includes, for example, a gate line GL, a first data line DL1, a second data line DL2, a first switching element TR4, a second switching element TR5, a first pixel electrode PE1, a second pixel electrode PE2 and a first alignment layer 120.

The gate line GL is extended in a first direction D1. The first data line DL1 is extended in a second direction D2 crossing the first direction D1. The second data line DL2 is extended in the second direction D2. It is noted that exemplary embodiments of the present invention are not limited to the above positions for the gate line GL, the first data line DL1 and the second data line DL2. For example, alternatively, the first data line DL1 and the second data line DL2 may be extended in the first direction D1 and the gate line GL may be extended in the second direction D2 crossing the first direction D1.

The first switching element TR4 includes, for example, a first gate electrode GE4, a first source electrode SE4, a first drain electrode DE4 and a first semiconductor pattern. The first gate electrode GE4 is extended from the gate line GL. The first source electrode SE4 is extended from the first data line DL1. The first drain electrode DE4 is spaced apart from the first source electrode SE4 and is electrically connected to the first pixel electrode PE1 through a first contact hole H4. For example, the first semiconductor pattern is disposed between the first drain electrode DE4 and the first gate electrode GE4 and between the first source electrode SE4 and the first drain electrode DE4.

The second switching element TR5 includes, for example, a second gate electrode GE5, a second source electrode SE5, a second drain electrode DE5 and a second semiconductor pattern. The second gate electrode GE5 is extended from the gate line GL. The second source electrode SE5 is extended from the second data line DL2. The second drain electrode DE5 is spaced apart from the second source electrode SE5 and is electrically connected to the second pixel electrode PE2 through a second contact hole H5. The second semiconductor pattern is disposed, for example, between a second drain electrode DE5 and the second gate electrode GE5 and between the second source electrode SE5 and the second drain electrode DE5.

The first pixel electrode PE1 is disposed on an area which includes, for example, at least two domains. The first pixel electrode PE1 includes, for example, a first opening portion OP1 formed along a boundary between adjacent domains.

The first opening portion OP1 is, for example, substantially the same as the first opening portion shown in FIGS. 1 and 7, so that any repetitive detailed description thereof will hereinafter be omitted.

The second pixel electrode PE1 is disposed, for example, adjacent to the first pixel electrode PE1. The second pixel electrode PE2 may be disposed on an area which includes, for example, at least two domains. The second pixel electrode PE2 may be disposed on an area which includes, for example, substantially the same domains as described above in connection with the first pixel electrode PE1.

The second pixel electrode PE2 may display an image having, for example, a same gradation as the first pixel electrode PE1.

The first and second pixel electrodes PE1 and PE2 may be simultaneously turned on by the gate line GL. For example, the first pixel electrode PE1 may receive a first voltage through the first data line DL1, and the second pixel electrode PE2 may receive a second voltage relatively lower than the first voltage through the second data line DL2.

Thus, the visibility of a display panel may be increased without decreasing the light transmittance of the display panel.

Figure 10:
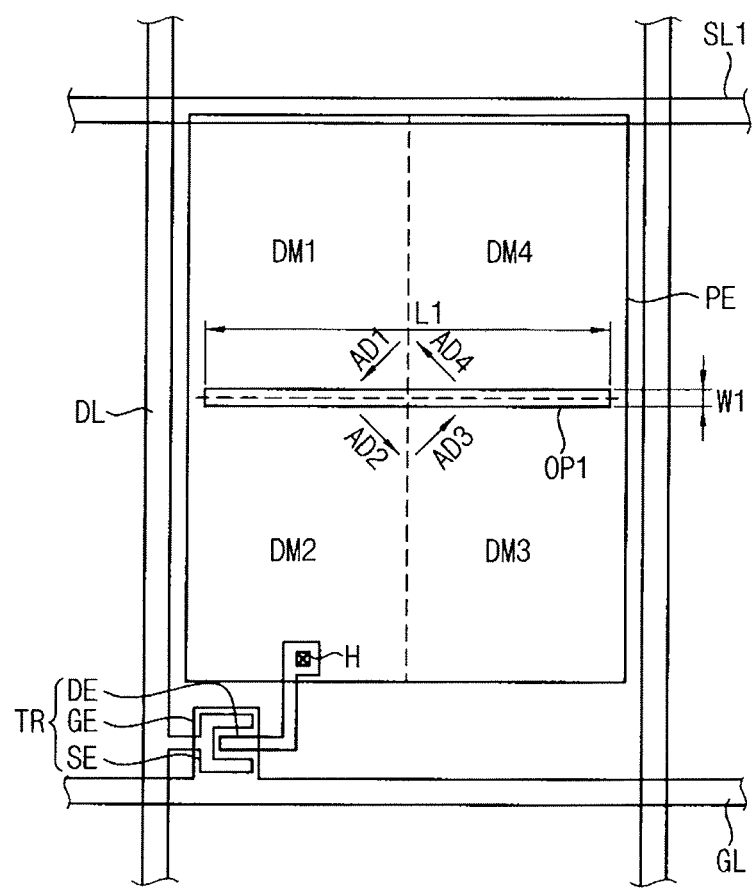
FIG. 10 is a cross-sectional view of a display panel according to an exemplary embodiment of the present invention.
Figure 10:
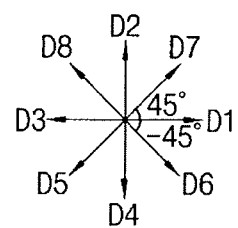

FIG. 10 is a cross-sectional view of a display panel according to an exemplary embodiment of the present invention.

The display panel according to the present exemplary embodiment is, for example, substantially the same as the display panel shown in FIG. 1 except for a pixel part. Elements shown in FIG. 10 which are the same or like elements shown in FIG. 1 have been labeled in FIG. 10 with the same reference characters as used above to describe these elements in connection with the display panel shown in FIG. 1, and any repetitive detailed description thereof will hereinafter be omitted.

Referring to FIG. 10, a pixel part of a first display substrate according to the present exemplary embodiment includes, for example, a gate line GL, a data line DL, a switching element TR, a pixel electrode PE and a first alignment layer 120.

The switching element TR includes, for example, a gate electrode GE, a source electrode SE, a drain electrode DE and a semiconductor pattern. The gate electrode GE is extended from the gate line GL. The source electrode SE is extended from the data line DL. The drain electrode DE is spaced apart from the source electrode SE and electrically connected to the pixel electrode PE through a contact hole H. The semiconductor pattern is disposed, for example, between the gate and source electrode GE and SE and the drain electrode DE.

The pixel electrode PE may be disposed on an area which includes, for example, at least two domains. The pixel electrode PE has, for example, an opening portion OP1 disposed along a boundary between adjacent domains.

The opening portion OP1 is, for example, substantially the same as the first opening portion shown in FIGS. 1 and 7, so that any repetitive detailed description thereof will hereinafter be omitted.

Thus, the visibility of a display panel may be increased without decreasing a light transmittance of the display panel.

According to an exemplary embodiment of the present invention, a pixel electrode corresponding to plural domains has an opening portion disposed along a boundary of domains adjacent to each other, so that a retardation difference between a front and a side may be decreased so that the visibility of a display panel may be increased.

Alignment directions correspond to first, second, third and fourth domains rotating in a counterclockwise or clockwise direction and a first pixel electrode receiving a high voltage has a first opening portion disposed along a boundary between upper domains and lower domains, so that a retardation difference between a front and a side may be decreased which in turn may result in the visibility of a display panel being increased.

Alignment directions correspond to first, second, third and fourth domains rotating in a counterclockwise or clockwise direction and a second pixel electrode receiving a low voltage has a second opening portion disposed along a boundary between left domains and right domains, so that a retardation difference between a front and a side may be decreased, which in turn may result in the visibility of a display panel being increased.

Having described exemplary embodiments of the present invention, it is further noted that it is readily apparent to those of reasonable skill in the art that various modifications may be made without departing from the spirit and scope of the invention which is defined by the metes and bounds of the appended claims

What is claimed is:

1. A display substrate comprising:
   a first electrode having a first opening portion formed therethrough; and
   a first alignment layer disposed on the first electrode,
   wherein the first alignment layer includes a first alignment part, a second alignment part, a third alignment part, and a fourth alignment part disposed at four equal quadrants of the first opening portion,
   wherein the first, second, third and fourth alignment parts have different alignment directions from each other,
   wherein the first alignment part is disposed in a first quadrant of the four equal quadrants and has only a first alignment direction, the second alignment part is disposed in a second quadrant of the four equal quadrants, immediately clockwise of the first quadrant, and has only a second alignment direction turned 90 degrees clockwise of the first alignment direction, the third alignment part is disposed in a third quadrant of the four equal quadrants, immediately clockwise of the second quadrant, and has only a third alignment direction turned 90 degrees clockwise of the second alignment direction, and the fourth alignment part is disposed in a fourth quadrant of the four equal quadrants, immediately clockwise of the third quadrant, and has only a fourth alignment direction turned 90 degrees clockwise of the third alignment direction.

2. The display substrate of claim 1, further comprising a gate line which extends in a first direction, wherein the first opening portion extends in the first direction, wherein the first alignment part is disposed at a first side of the first opening portion, and wherein the second alignment part is disposed at a second side of the first opening portion.

3. The display substrate of claim 2, wherein a width of the first opening portion is about 2 μm to about 4.5 μm.

4. The display substrate of claim 1, further comprising:
a second electrode disposed adjacent to the first electrode,
wherein the second electrode is configured to receive a first voltage different from a second voltage applied to the first electrode with respect to an identical gradation,
wherein the second electrode has a second opening portion formed therethough; and
a second alignment layer disposed on the second electrode, wherein the second alignment layer includes a fifth alignment part, a sixth alignment part, a seventh alignment part, and an eighth alignment part disposed at four equal quadrants of the second opening portion, and
wherein the fifth alignment part, the sixth alignment part, the seventh alignment part, and the eight alignment part have different alignment directions from each other.

5. The display substrate of claim 4, wherein the first electrode is a first pixel electrode and the second electrode is a second pixel electrode.

6. The display substrate of claim 5, further comprising a data line which extends in a second direction crossing the first direction, wherein the second opening portion extends in the second direction.

7. A display panel comprising:
a first display substrate comprising:
a first electrode having a first opening portion formed therethrough; and
a first alignment layer disposed on the first electrode,
wherein the first alignment layer includes a first alignment part, a second alignment part, a third alignment part, and a fourth alignment part, disposed at four equal quadrants of the first opening portion,
wherein the first, second, third and fourth alignment parts have different alignment directions from each other, and
wherein the first alignment part is disposed in a first quadrant of the four equal quadrants and has only a first alignment direction, the second alignment part is disposed in a second quadrant of the four equal quadrants, immediately clockwise of the first quadrant, and has only a second alignment direction turned 90 degrees clockwise of the first alignment direction, the third alignment part is disposed in a third quadrant of the four equal quadrants, immediately clockwise of the second quadrant, and has only a third alignment direction turned 90 degrees clockwise of the second alignment direction, and the fourth alignment part is disposed in a fourth quadrant of the four equal quadrants, immediately clockwise of the third quadrant, and has only a fourth alignment direction turned 90 degrees clockwise of the third alignment direction; and
a second display substrate comprising:
a second electrode facing the first electrode, and
a liquid crystal layer disposed between the first display substrate and the second display substrate,
wherein the liquid crystal layer comprises liquid crystal molecules aligned along the first, second, third, and fourth alignment parts.

8. The display panel of claim 7, wherein the first electrode is a pixel electrode and the second electrode is a common electrode.

9. The display panel of claim 8, wherein the common electrode has an opening portion disposed therethrough, and
wherein the opening portion of the common electrode overlaps with the pixel electrode.

10. The display panel of claim 7, wherein the first display substrate further comprises a gate line which extends in a first direction,
wherein the first opening portion extends in the first direction.

11. A method of manufacturing a display substrate, the method comprising:
forming a transparent pattern comprising a first electrode having a first opening portion formed therethrough on a base substrate; and
forming an alignment layer comprising a first alignment part, a second alignment part, a third alignment part, and a fourth alignment part disposed at four equal quadrants of the first opening portion of the first electrode; and
wherein the forming of the alignment layer comprises:
forming a photoreactive material on the first electrode;
irradiating light onto the photoreactive material disposed at a first quadrant of the four equal quadrants of the first opening portion to form the first alignment part having only a first alignment direction different from the first direction;
irradiating light onto the photoreactive material disposed at a second quadrant of the four equal quadrants of the first opening portion, immediately clockwise of the first quadrant, to form the second alignment part having only a second alignment direction turned 90 degrees clockwise of the first alignment direction;
irradiating light onto the photoreactive material disposed at a third quadrant of the four equal quadrants of the first opening portion, immediately clockwise of the second quadrant, to form the third alignment part having only a third alignment direction turned 90 degrees clockwise of the second alignment direction; and
irradiating light onto the photoreactive material disposed at a fourth quadrant of the four equal quadrants of the first opening portion, immediately clockwise of the third quadrant, to form the fourth alignment part having only a fourth alignment direction turned 90 degrees clockwise of the third alignment direction.

12. The method of claim 11, further comprising:
prior to forming the transparent pattern, forming a gate pattern comprising a gate line which extends in a first direction on the base substrate; and
forming a data pattern comprising a data line which extends in a second direction crossing the first direction on the base substrate where the gate pattern is formed,
wherein the first opening portion extends in the first direction.

13. The method of claim 11, wherein the forming of the transparent pattern further comprises forming a second electrode disposed adjacent to the first electrode, which has a second opening portion which extends in the second direction,
wherein the second electrode is configured to receive a first voltage different from a second voltage applied to the first electrode with respect to a same gradation,
wherein the forming of the alignment layer further comprises:
irradiating light onto the photoreactive material disposed at four equal quadrants of the second opening portion to form fifth, sixth, seventh, and eighth alignment parts each having different alignment directions that are different from the first direction.

14. A method of manufacturing a display panel, the method comprising:
forming a first electrode having a first opening portion formed therethrough on a first base substrate and an alignment layer comprising a first alignment part, a second alignment part, a third alignment part, and a fourth alignment part disposed at four equal quadrants of the first opening portion of the first electrode to form a first display substrate;
forming a second electrode facing the first electrode on a second base substrate to form a second display substrate; and
forming a liquid crystal layer between the first display substrate and the second display substrate,
wherein the first alignment part is disposed in a first quadrant of the four equal quadrants and has only a first alignment direction, the second alignment part is disposed in a second quadrant of the four equal quadrants, immediately clockwise of the first quadrant, and has only a second alignment direction turned 90 degrees clockwise of the first alignment direction, the third alignment part is disposed in a third quadrant of the four equal quadrants, immediately clockwise of the second quadrant, and has only a third alignment direction turned 90 degrees clockwise of the second alignment direction, and the fourth alignment part is disposed in a fourth quadrant of the four equal quadrants, immediately clockwise of the third quadrant, and has only a fourth alignment direction turned 90 degrees clockwise of the third alignment direction.

15. The method of claim 14, wherein the forming of the display substrate comprises:
forming a gate pattern comprising a gate line which extends in a first direction on the first base substrate;
forming a data pattern comprising a data line which extends in a second direction crossing the first direction on the first base substrate on which the gate pattern is formed;
forming a first electrode having a first opening portion which extends in the first direction on the first base substrate on which the data pattern is formed;
forming a photoreactive material on the first electrode;
irradiating light onto the photoreactive material disposed on the first quadrant of the first opening portion to form the first alignment part having only the first alignment direction;
irradiating light onto the photoreactive material disposed on the second quadrant of the first opening portion to form the second alignment part having only the second alignment direction;
irradiating light onto the photoreactive material disposed on the third quadrant of the first opening portion to form the third alignment part having only the third alignment direction; and
irradiating light onto the photoreactive material disposed on the fourth quadrant of the first opening portion to form the fourth alignment part having only the fourth alignment direction.

16. The method of claim 14, wherein the forming of the second display substrate further comprises:
forming a color filter on the second base substrate;
forming the second electrode on the color filter;
forming a photoreactive material on the color filter;
irradiating light onto the photoreactive material on the color filter to form fifth, sixth, seventh, and eight alignment parts each having a different alignment direction.

17. The method of claim 14, wherein the forming of the first display substrate further comprises forming a color filter on the first base substrate,
wherein the forming of the second display substrate further comprises:
forming a gate pattern comprising a gate line which extends in a first direction on the second base substrate; and
forming a data pattern comprising a data line which extends in a second direction crossing the first direction.

18. A display panel comprising:
a first display substrate comprising:
a first pixel electrode having a first opening portion disposed therethrough,
wherein the first pixel electrode having the first opening portion disposed therethrough is disposed on an area including a first domain, a second domain, a third domain and a fourth domain,
wherein the first alignment direction, the second alignment direction, the third alignment direction and the fourth alignment direction are perpendicular to each other, and
wherein the first domain is disposed in a first quadrant of four equal quadrants of the first opening portion and has only a first alignment direction, the second alignment part is disposed in a second quadrant of the four equal quadrants, immediately clockwise of the first quadrant, and has only a second alignment direction turned 90 degrees clockwise of the first alignment direction, the third alignment part is disposed in a third quadrant of the four equal quadrants, immediately clockwise of the second quadrant, and has only a third alignment direction turned 90 degrees clockwise of the second alignment direction, and the fourth alignment part is disposed in a fourth quadrant of the four equal quadrants, immediately clockwise of the third quadrant, and has only a fourth alignment direction turned 90 degrees clockwise of the third alignment direction;
a second pixel electrode disposed adjacent to the first pixel electrode a first alignment layer including a first alignment part, a second alignment part, a third alignment part and a fourth alignment part,
wherein the first alignment part, the second alignment part, the third alignment part and the fourth alignment parts are disposed on the first alignment layer at a location corresponding to the first domain, the second domain, the third domain and the fourth domain, respectively;
a second display substrate comprising:
a common electrode facing the first and second pixel electrodes; and
a liquid crystal layer disposed between the first display substrate and the second display substrate,
wherein liquid crystals of the liquid crystal layer disposed at a location corresponding to the first alignment part, the second alignment part, the third alignment part and the fourth alignment part are aligned in the first alignment direction, the second alignment direction, the third alignment direction and the fourth alignment direction, respectively.

19. The display panel of claim 18, wherein the first opening portion of the first pixel electrode extends in a first direction along a boundary between the first and fourth domains and the second and third domains, and
wherein the second pixel electrode includes a second opening portion disposed therethrough,
wherein the second opening portion of the second pixel electrode extends in a second direction crossing the first direction along a boundary between domains substantially identical to the first, second, third and fourth domains.

20. The display panel of claim 18, wherein the first opening portion of the first pixel electrode extends in a first direction along substantially an entire boundary between the first and fourth domains and the second and third domains except for a center portion of the first pixel electrode disposed at the boundary between the first and fourth domains and the second and third domains.

21. The display panel of claim 18, wherein the opening portion of the common electrode overlaps with the first pixel electrode and wherein a length of the opening portion of the common electrode is smaller than a length of the first pixel electrode in a first direction.

* * * * *